US011353354B2

(12) United States Patent
Kim et al.

(10) Patent No.: US 11,353,354 B2
(45) Date of Patent: Jun. 7, 2022

(54) SYSTEM FOR AUTOMATICALLY MEASURING DISCHARGE IN REAL-TIME BASED ON CCTV IMAGE AND METHOD THEREOF

(71) Applicants: HYDROSEM, Yongin-si (KR); REPUBLIC OF KOREA (NATIONAL DISASTER MANAGEMENT RESEARCH INSTITUTE), Ulsan (KR)

(72) Inventors: Seo Jun Kim, Yongin-si (KR); Byung Man Yoon, Yongin-si (KR); Ho Jun You, Yongin-si (KR); Dong Su Kim, Incheon (KR); Tae Sung Cheong, Seoul (KR); Jae Seung Joo, Ulsan (KR); Hyeon Seok Choi, Ulsan (KR)

(73) Assignees: HYDROSEM, Yongin-si (KR); REPUBLIC OF KOREA (NATIONAL DISASTER MANAGEMENT RESEARCH INSTITUTE), Ulsan (KR)

( * ) Notice: Subject to any disclaimer, the term of this patent is extended or adjusted under 35 U.S.C. 154(b) by 202 days.

(21) Appl. No.: 16/617,359

(22) PCT Filed: Nov. 29, 2018

(86) PCT No.: PCT/KR2018/014987
§ 371 (c)(1),
(2) Date: Nov. 26, 2019

(87) PCT Pub. No.: WO2020/101104
PCT Pub. Date: May 22, 2020

(65) Prior Publication Data
US 2021/0341330 A1  Nov. 4, 2021

(30) Foreign Application Priority Data
Nov. 13, 2018 (KR) ........................ 10-2018-0139116

(51) Int. Cl.
*G01F 1/002* (2022.01)
*G01F 1/712* (2006.01)
(Continued)

(52) U.S. Cl.
CPC .............. *G01F 23/02* (2013.01); *G01S 19/01* (2013.01); *G06F 17/16* (2013.01); *G06T 7/66* (2017.01); *H04N 7/18* (2013.01)

(58) Field of Classification Search
CPC ....... B60R 25/25; B60R 25/305; B60R 25/31; B60R 2325/101; B60R 2325/205;
(Continued)

(56) References Cited

U.S. PATENT DOCUMENTS 6,983,662 B2 * 1/2006 McLaughlin ........ A61B 5/0285
73/861.42
9,262,713 B2 * 2/2016 Shelley ................ G06N 3/0427
(Continued)

FOREIGN PATENT DOCUMENTS

JP  2006-258575 A  9/2006
JP  2008-058264 A  3/2008
(Continued)

OTHER PUBLICATIONS

International Search Report for PCT/KR2018/014987 dated Aug. 2, 2019 from Korean Intellectual Property Office.

*Primary Examiner* — Philip P. Dang
(74) *Attorney, Agent, or Firm* — Paratus Law Group, PLLC

(57) ABSTRACT

Disclosed is a system for automatically measuring a discharge in real time based on a CCTV image. The system includes: a water depth measurement device filtering water depth data measured by a measurement means with a local linear regression-based bivariate scatterplot smoothing technique through flexible bandwidth application to calculate the
(Continued)

water depth of a stream; an image acquisition device acquiring a continuous image of a flow speed measurement side of the stream; an image analysis PC using an image of the image acquisition device to measure the surface flow speed in real time and receiving a measured water depth from the water depth measurement device to measure the discharge in real time with cross-section data; and a discharge calculation and management server for transmitting and displaying a real-time discharge measurement result based on a web.

18 Claims, 13 Drawing Sheets

(51) Int. Cl.
    *G01F 23/02*     (2006.01)
    *G06T 7/66*     (2017.01)
    *G01S 19/01*     (2010.01)
    *G06F 17/16*     (2006.01)
    *H04N 7/18*     (2006.01)

(58) Field of Classification Search
    CPC . B60R 25/34; G06T 7/50; G06T 2207/10028; G06T 2207/20084; G06T 2207/30201; G06T 2207/30252; G06K 9/00268; G06K 9/00288; G06K 9/00899; G06K 9/629; G06K 2209/21; G06K 9/00248; G06K 9/4628; G06K 9/00791; G06K 9/00906; H04N 7/188; H04W 4/023; H04W 4/40; H04W 12/06; H04L 63/0861; G06N 3/08; G07C 9/00563; G07C 2209/63
See application file for complete search history.

(56) References Cited

U.S. PATENT DOCUMENTS

| | | | |
|---|---|---|---|
| 9,541,432 B2 * | 1/2017 | Kertesz | H01M 10/4257 |
| 9,858,469 B2 * | 1/2018 | Al-Kofahi | G06V 10/42 |
| 10,131,361 B2 * | 11/2018 | Jang | G08G 1/052 |
| 10,282,622 B2 * | 5/2019 | Togashi | G06T 7/277 |
| 10,761,099 B2 * | 9/2020 | Ziady | G01N 33/6893 |
| 2017/0277815 A1 * | 9/2017 | Lorang | G01S 15/86 |

FOREIGN PATENT DOCUMENTS

| | | |
|---|---|---|
| JP | 2010-237732 A | 10/2010 |
| KR | 10-0817907 B1 | 3/2008 |
| KR | 10-2016-0100788 A | 8/2016 |

* cited by examiner

▪ DerivativeX

▪ DerivativeT((t-1)Frame)

▪ DerivativeY

▪ DerivativeT(t Frame)

SYSTEM FOR AUTOMATICALLY MEASURING DISCHARGE IN REAL-TIME BASED ON CCTV IMAGE AND METHOD THEREOF

CROSS-REFERENCE TO PRIOR APPLICATIONS

This application is a National Stage Patent Application of PCT International Patent Application No. PCT/KR2018/014987 (filed on Nov. 29, 2018) under 35 U.S.C. § 371, which claims priority to Korean Patent Application No. 10-2018-0139116 (filed on Nov. 13, 2018), which are all hereby incorporated by reference in their entirety.

BACKGROUND

The present invention relates to stream discharge calculation, and more particularly, to a closed-circuit television (CCTV) image based real-time automatic discharge measurement system and method, which provide a site image for coping with a situation in real time and collect water depth and flow velocity information through image-based automatic discharge measurement optimized to a small stream to measure a discharge in real time.

Currently, in Korea, although 22,823 small streams are distributed throughout the country, the number of local government officials who can manage the streams is absolutely insufficient.

For this reason, only national streams managed by the central government have been measured so far. Due to an improved quality of life, demands for reducing flood damage of small streams in local communities are increasing such that there is a need for automated measurement technology in which streams may be measured with less manpower.

There are many types of hydraulic and hydrology data needed to manage streams. Among them, rainfall data for stream basins, and water depth data and discharge data of the streams are the most important data.

The rainfall data for stream basins is continuously and automatically measured by various rain gauges and, currently, is appropriately being measured in terms of the frequency or accuracy of measurement data.

On the other hand, due to the difficulty of measurement of the water depth data and the discharge data of the stream, the water depth and discharge measurements are much less frequent and accurate than the rainfall measurement.

In particular, the discharge measurement is very difficult. There are several observations stations using horizontal acoustic Doppler current profilers (H-ADCPs) to automate measurements, but not all flow rates are measured, and thus a large part of measurement data needs to be corrected.

Currently, in Korea, a method in which a water depth is measured and the measured water depth is converted into a discharge by applying a water depth-discharge curve prepared in advance is mainly adopted (Hydrological Survey Center, 2014).

On the other hand, the water depth measurement is relatively easily and consecutively carried out because it is easier to automate than the discharge measurement.

In Korea, the water depth measurement is usually carried out by a float water-depth meter, a pressure water-depth meter, an ultrasonic water-depth meter, or the like.

An ultrasonic water-depth measurement device outputs ultrasonic waves in a direction of a water surface to be measured, detects the ultrasonic waves reflected by a water surface, and then calculates a height of the water surface using the reflected ultrasonic waves.

In the case of large national and local streams, water depth measurement results may be presented as one curve because a change in water depth of a stream is relatively gradually increased according to passage of time during flooding.

However, in the case of small streams, the outflow occurs rapidly during flooding and slopes of most of the streams are steep, and thus the water surfaces of the streams are very rough. For this reason, even with a water depth measurement sensor having good performance, there is a limitation that the results of the water depth measurement in the small streams during flooding are very irregular.

Therefore, the accuracy of the water depth measurement results in the small streams during flooding is very poor and directly affects the reliability of a small stream discharge measurement and flood forecasting system using the water depth measurement results, and thus there is a need for a filtering technique for quality control of water depth measurement results in small streams during flooding.

The stream flow velocity measurement will be described as follows.

Generally, in order to measure a flow velocity of water flowing through a stream, when water flows normally, methods using detectors such as a propeller velocity meter, a cup-type velocity meter, an electronic velocity meter, and the like are in use, and during flooding, a float observation method is mainly in use.

The velocity meters used to measure the flow velocity during the normal water flow can only measure a flow velocity at one point, which makes it difficult to analyze vortex formation or a flow direction.

As a result, it takes a great deal of time, effort, and money to measure a flow velocity over a full width of the stream.

Meanwhile, when a flood occurs in the stream, a flow velocity is high and a water depth is high, and thus there are many risks in approaching the stream. For this reason, the conventional velocity meters in which a detector such as a propeller velocity meter or an electronic velocity meter should be put into water is difficult to use during flooding.

On the other hand, in the float observation method which is widely used in floods, high accuracy observation cannot be expected due to manpower problems, lack of readiness (high probability of peak discharge missing), unavailability of continuous observation, follow-up indicating whether a float accurately follows water with a flow velocity, choice of a length of the float, or the like.

In particular, small streams, unlike the national and local streams, have a small basin area and a steep slope so that a peak arrival time is very short and the flow is complex. Therefore, the float observation method is less reliable. In addition, in the small streams, since it is difficult to find a straight line having a certain length to use the float and find a safe area for measurement, non-contact measurement technology that can be utilized in small streams is required.

As described above, demands for reducing damage caused by flooding of small streams in local communities are increasing and thus there is a need for automated measurement technology in which streams may be measured with less manpower.

Therefore, various methods have been sought to automate or facilitate such measurement. Among the methods, a surface image flow velocity measurement method is a method likely to solve various problems of the conventional methods.

The surface image flow velocity measurement method is a method of calculating a flow velocity by extracting an image of a stream surface from an aerial photograph or video image of the stream surface.

The surface image flow velocity measurement method is largely divided into a method using template pattern matching and a method using a spatio-temporal image (STI).

The template pattern matching is a method of measuring a two-dimensional flow velocity distribution of a stream surface using a pair of images on the basis of particle image velocimetry (PIV).

The template pattern matching is a method of dividing a frame into blocks of a certain size and calculating a moving distance by finding a block having a contrast value most similar to a current block in the next frame. A difference in average absolute value should be calculated for all the displacements around the block in order to increase the accuracy of moving distance vector estimation. In this case, as a window size increases, more computation time is required and thus it is difficult to measure the flow velocity in real time.

Meanwhile, the STI analysis method is a method of analyzing a plurality of consecutive images (spatial-temporal images) at once and analyzing an average flow velocity during a time period.

An example of using a spatio-temporal image is space-temporal image velocimetry (STIV).

However, the STIV has a problem in that a transverse distribution of the flow velocity is measured by limiting a measurement target to only a mainstream direction component in order to improve practicality.

In addition, the STI analysis method is a method of calculating a flow velocity by calculating a change in contrast values of several consecutive pixels in an image according to the time. The STIV is good for calculating a time-averaged flow velocity because the contrast values of the pixel should be obtained for a certain period of time. However, when there are many ripples on the water surface, a great deal of noise may be generated and thus the accuracy may be reduced.

In particular, since the contrast values have to be time-averaged, there are limitations in applying the STIV to the real-time flow velocity measurement because of a large amount of calculation.

In such flow velocity measurement methods in the related art, the image acquisition and image analysis processes are complicated and it is difficult to automatically measure the flow velocity in real time because reference point measurement is required.

In particular, a two-dimensional projection coordinate conversion method and a three-dimensional projection coordinate conversion method are used for image conversion in the image acquisition and image analysis process in the related art.

In the two-dimensional projection coordinate conversion method, at least four reference points having the same height as a water surface are required and it is necessary but difficult to reset the heights of the reference points according to a change in water depth and thus many errors occur.

Further, in the three-dimensional projection coordinate conversion method, six reference points having different heights and one reference point having the same height as a water surface are required and a new mapping coefficient needs to be applied according to a change in water depth.

In such a three-dimensional projection coordinate conversion method, when the water depth is increased to be higher than the six reference points having different heights, the method is not applicable and there are many reference points and thus the accuracy is degraded due to measurement errors.

As described above, there is a demand for the development of new techniques for measuring a water depth, a flow velocity, and a discharge for efficient management of small streams, and there is a demand for the construction of new stream management systems for enhancing usability of access and retrieval of pieces of measured and calculated stream information.

SUMMARY

The present invention is directed to solving the problems of the stream discharge measurement technique in the related art and is directed to providing a closed-circuit television (CCTV) image based real-time automatic discharge measurement system and method, which provide a site image for coping with a situation in real time and collect water depth and flow velocity information through image-based automatic discharge measurement optimized to a small stream to measure a discharge in real time.

The present invention is directed to providing the CCTV image based real-time automatic discharge measurement system and method, which calculate a pixel flow velocity from consecutive images collected by a camera for cross-sectional information, an analysis time, an analysis interval, and an analysis region of a site, convert the pixel flow velocity into an actual physical flow velocity, and calculate a real-time automatic discharge using the actual physical flow velocity to increase the efficiency and accuracy.

The present invention is directed to providing the CCTV image based real-time automatic discharge measurement system and method, which store correlations between actual coordinates and image coordinates in the form of a matrix when an image is converted, covert a flow velocity calculated as a pixel flow velocity into an actual flow velocity using the matrix to increase the accuracy of the flow velocity calculation, and calculate a real-time automatic discharge using the actual physical flow velocity to increase the efficiency and accuracy.

The present invention is directed to providing the CCTV image based real-time automatic discharge measurement system and method, which increase the efficiency and accuracy of real-time automatic discharge calculation using optical flow image processing for calculating a pixel flow velocity, determining a grid point position, a pixel flow velocity, and a filter coefficient parameter, and performing filtering when an error calculated when a point flow velocity is calculated is greater than the filter coefficient, to increase the accuracy of the point flow velocity calculation.

The present invention is directed to providing the CCTV image based real-time automatic discharge measurement system and method, which allow image coordinates of a reference point viewed by a camera not to be changed even when a water depth changes by applying a method for image distortion correction in consideration of a change in stream water depth, allow errors of the measured actual coordinates and conversion results not to be generated, and thus allow the image distortion to be accurately corrected.

The present invention is directed to providing the CCTV image based real-time automatic discharge measurement system and method, which filter positioning data of a water depth measuring unit using a local linear regression-based bivariate scatterplot smoothing technique through adaptive bandwidth application and provide water depth information with increased accuracy in real time.

The present invention is directed to providing the CCTV image based real-time automatic discharge measurement system and method, which store calculated discharge and water depth information in a database and provide a corresponding result through a Web page of a Web server to increase the efficiency of the stream management.

The scope of the present invention is not limited to the above-described objects, and other unmentioned objects may be clearly understood by those skilled in the art from the following descriptions.

One aspect of the present invention provides a closed-circuit television (CCTV) image based real-time automatic discharge measurement system, which includes a water depth measurement device configured to filter water depth data measured by a measurement unit using a local linear regression-based bivariate scatterplot smoothing technique through adaptive bandwidth application to calculate a water depth of a stream, an image acquisition device configured to acquire consecutive images of a flow velocity measurement site of the stream, an image analysis personal computer (PC) configured to measure a surface flow velocity in real time using the images of the image acquisition device and receive the measured water depth from the water depth measurement device to measure a discharge in real time with cross-section data, and a discharge calculation and management server configured to transmit and display a real-time discharge measurement result based on the Web.

One aspect of the present invention provides a CCTV image based real-time automatic discharge measurement method, which includes: an operation of acquiring consecutive images of a flow velocity measurement site of a stream; an operation of dynamically extracting frames of the consecutive images, image-converting the extracted frames, and performing homography calculation in order to normalize the acquired image data; an operation of extracting an analysis region of an analysis point and calculating a pixel flow velocity through the extracted image in the analysis region of the analysis point; an operation of converting the calculated pixel flow velocity into an actual flow velocity and calculating a discharge using the actual flow velocity; and an operation of receiving water depth information calculated by a positioning filtering process, storing the water depth information in a database through a Web page of a Web server, and providing the corresponding discharge and water depth information through the Web page of the Web server.

A closed-circuit television (CCTV) image based real-time automatic discharge measurement system and method according to the present invention have the following effects.

First, a site image for coping with a situation in real time is provided and water depth and flow velocity information is collected through image-based automatic discharge measurement optimized to a small stream, and thus a discharge can be accurately measured in real time.

Second, a pixel flow velocity is calculated from consecutive images collected by a camera for cross-sectional information, an analysis time, an analysis interval, and an analysis region of a site and the pixel flow velocity is converted into an actual physical flow velocity, and a real-time automatic discharge is calculated using the actual physical flow velocity, and thus the efficiency and accuracy can be increased.

Third, a pixel flow velocity is calculated, a grid point position, a pixel flow velocity, and a filter coefficient parameter are determined, and filtering is performed when an error calculated when a point flow velocity is calculated is greater than a filter coefficient, and thus the accuracy of the point flow velocity calculation can be increased.

Fourth, image coordinates of a reference point viewed by a camera are allowed not to be changed even when a water depth changes by applying a method for image distortion correction in consideration of a change in stream water depth, and errors of the measured actual coordinates and conversion results are allowed not to be generated, and thus the image distortion is allowed to be accurately corrected.

Fifth, positioning data of a water depth measuring unit is filtered using a local linear regression-based bivariate scatterplot smoothing technique through adaptive bandwidth application, and thus water depth information with increased accuracy can be provided in real time.

Sixth, calculated discharge and water depth information is stored in a database and a corresponding result is provided through a Web page of a Web server, and thus the efficiency of the stream management can be increased.

DETAILED DESCRIPTION

Hereinafter, exemplary embodiments of a closed-circuit television (CCTV) image based real-time automatic discharge measurement system and method according to the present invention will be described in detail as follows.

Features and advantages of the CCTV image based real-time automatic discharge measurement system and method according to the present invention will become clear from the detailed description of each embodiment below.

Figure 1A:
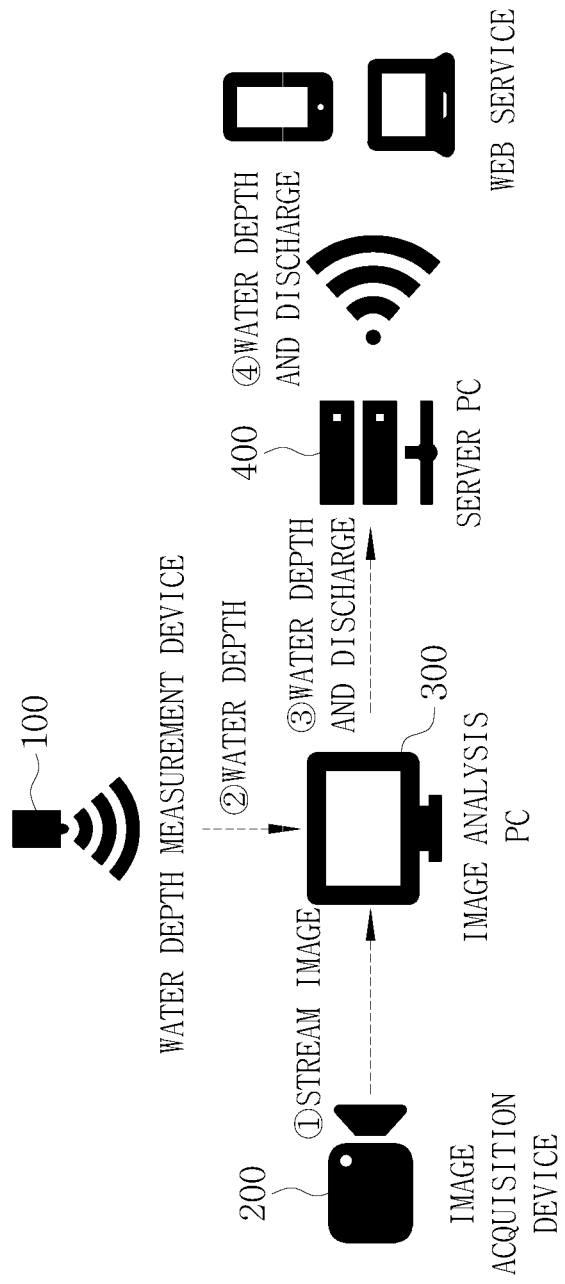
FIG. 1A is an overall configuration diagram of a closed-circuit television (CCTV) image based real-time automatic discharge measurement system.
Figure 1B:
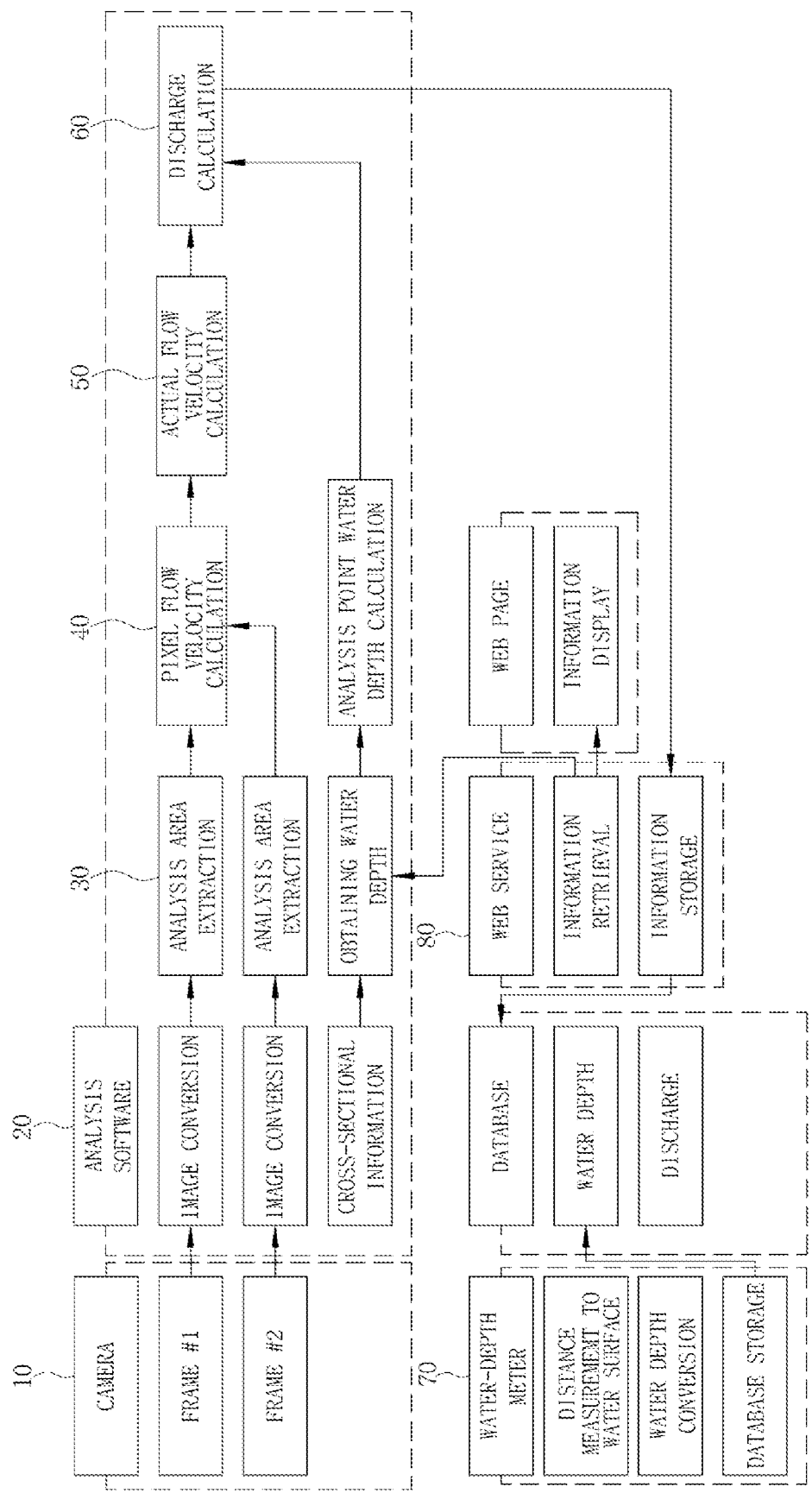
FIG. 1B is a detailed configuration diagram of the CCTV image based real-time automatic discharge measurement system according to the present invention.

FIG. 1A is an overall configuration diagram of a CCTV image based real-time automatic discharge measurement system, and FIG. 1B is a detailed configuration diagram of the CCTV image based real-time automatic discharge measurement system according to the present invention.

Heretofore, the discharge measurement has been made by a method of discontinuously measuring hydraulic and hydrology data in the field by a person, storing measurement results in equipment, and then downloading the data to a personal computer (PC) to measure a flow rate. Therefore, it is difficult to automate the discharge measurement.

Therefore, the CCTV image based real-time automatic discharge measurement system and method according to the present invention include a configuration for continuous unmanned measurement of hydraulic and hydrology data such as flow velocity and water depth of small streams, real-time collecting of hydraulic and hydrology data measurement results and measuring of flow rate, and transmitting and displaying a real-time discharge measurement result based on the Web.

The CCTV image based real-time automatic discharge measurement system and method according to the present invention include a configuration for real time analysis of measured data and measuring and transmitting discharge as well as a device for automatically measuring water depth, flow velocity, etc.

The CCTV image based real-time automatic discharge measurement system and method according to the present invention may include the following technical features to increase the efficiency and accuracy of real-time discharge calculation.

The present invention may include a configuration for calculating a pixel flow velocity from consecutive images collected by a camera for cross-sectional information, an analysis time, an analysis interval, and an analysis region of a site and converting the pixel flow velocity into an actual physical flow velocity.

The present invention includes a configuration for optical flow image processing, and in the optical flow image processing, a place where a contrast value distribution at a specific position of one frame and a contrast value distribution at a next frame are best matched is found so that a moving distance is calculated.

Since the moving distance is calculated using the contrast value of each pixel in the image, the calculation time is advantageously very short. Therefore, the real-time flow velocity may be calculated very rapidly even in the case of a sharp increase in a discharge in the stream so that the optical flow image processing may be effectively applied to real-time flow velocity measurement of the stream that cannot be performed by large scale particle image velocimetry (LSPIV) and space-temporal image velocimetry (STIV).

To this end, the present invention may include a configuration in which correlations between actual coordinates and image coordinates are stored in the form of a matrix when an image is converted and a flow velocity calculated as a pixel flow velocity is converted into an actual flow velocity using the matrix.

The present invention may include a configuration in which images are stored in an array by reading a preset grid setting and declaring the number N of images to be analyzed and the array (a matrix) for storing analysis results and analysis between images is repeated as many times as the number of grid points so that the accuracy of the surface flow velocity field calculation may be increased.

The present invention may include a configuration in which a pixel flow velocity is calculated, a grid point position, a pixel flow velocity, and a filter coefficient parameter are determined, and filtering is performed when an error calculated when a point flow velocity is calculated is greater than a filter coefficient.

The present invention may use a two-dimensional projection coordinate conversion program and a cross-correlation method in order to measure the surface flow velocity, and include an image conversion configuration for converting the distorted image into the normal image, an image analysis configuration for measuring the surface flow velocity using a cross-correlation method (calculate the displacement of tracer groups by searching for similarity of contrast value distribution within the size of the correlation region), a filtering configuration for removing data having a low correlation coefficient among pieces of the measured flow velocity data, and a configuration for storing the measured flow velocity data which is time-averaged as measurement results.

The present invention may include a configuration in which image coordinates of a reference point viewed by a camera are allowed not to be changed by applying a method for image distortion correction in consideration of a change in stream water depth even when the water depth changes, and errors of the measured actual coordinates and conversion results are allowed not to be generated, and thus the image distortion is allowed to be accurately corrected.

In addition, the present invention may include an algorithm for filtering water depth data of a small stream during flooding, which is measured in order to increase the accuracy of the stream water depth measurement, and include a water depth data correction algorithm for minimizing uncertainty of water depth measurement due to rough water surface ripples.

In particular, the measured water depth data may be transmitted to a system controller and a server PC in a wired or wireless manner to be utilized as input data of an automatic discharge measurement program, and the measured water depth data may be checked in real time by a real-time water depth and discharge display Web service.

In addition, a stream water depth measurement device based on Arduino using an open source based single board microcontroller may be included so that development and application environments may be improved.

The automatic discharge measurement system according to the present invention includes a water depth measurement device 100, an image acquisition device 200 such as a CCTV, an image analysis PC 300, and a discharge calculation and management server 400 for data transmission.

As illustrated in FIG. 1A, the automatic discharge measurement system includes a water depth measurement device 100 which filters water depth data measured by a measurement unit using a local linear regression-based bivariate scatterplot smoothing technique through adaptive bandwidth application to calculate a water depth of a stream, an image acquisition device 200 which acquires consecutive images of a flow velocity measurement site of the stream, an image analysis PC 300 which measures a surface flow velocity in real time using the images of the image acquisition device 200 and receives the measured water depth from the water depth measurement device 100 to measure a discharge in real time with cross-section data, and a discharge calculation and management server 400 which transmits and displays a real-time discharge measurement result based on the Web.

The CCTV image based real-time automatic discharge measurement system according to the present invention having such a configuration performs continuous unmanned measurement of hydraulic and hydrology data such as flow velocity and water depth of small streams, performs real-time collection of hydraulic and hydrology data measurement results and discharge measurement, and performs transmission and display of the web-based real-time flow measurement results.

Specifically, as illustrated in FIG. 1B, the CCTV image based real-time automatic discharge measurement system according to the present invention includes an image photographing unit 10 which acquires consecutive images of a flow velocity measurement site of the stream, an image conversion analysis unit 20 which dynamically extracts frames of the consecutive images in order to normalize image data of the image photographing unit 10, image-converts the extracted frames, and performs homography calculation, an analysis region extracting unit 30 which extracts an analysis region of an analysis point, a pixel flow velocity calculating unit 40 which calculates a pixel flow velocity using an image in the analysis region of the analysis point extracted by the analysis region extracting unit 30, an actual flow velocity calculating unit 50 which converts the pixel flow velocity calculated by the pixel flow velocity calculating unit 40 into an actual flow velocity, a water depth measuring unit 70 which filters the measured water depth data to calculate a water depth of the stream, and a discharge calculating unit 60 which performs real-time discharge calculation using the actual flow velocity of the actual flow velocity calculating unit 50 and the water depth information of the water depth measuring unit 70.

A real-time discharge measurement method of the CCTV image based real-time automatic discharge measurement system according to the present invention having such a configuration is as follows.

Figure 2:
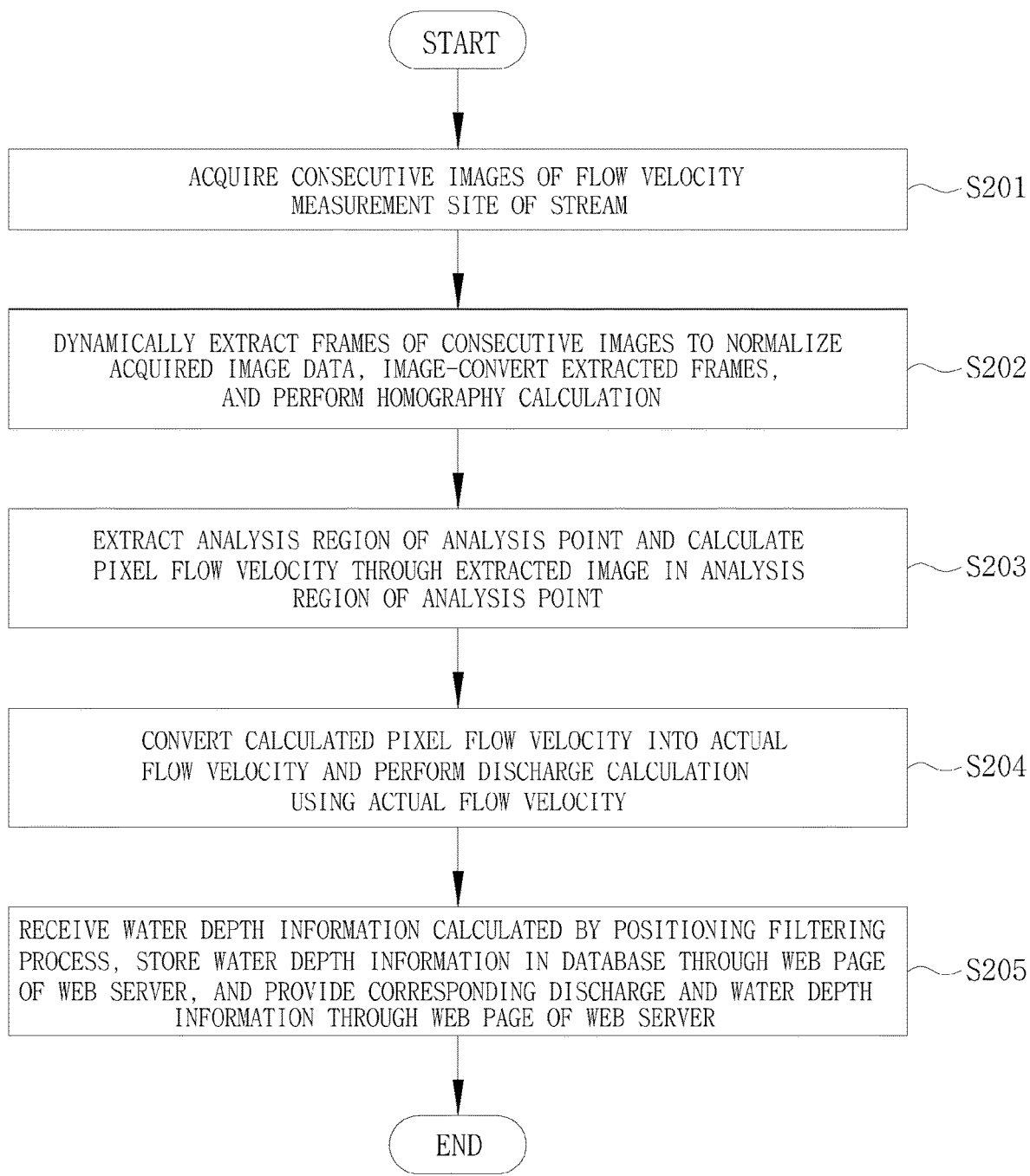
FIG. 2 is a flowchart illustrating a CCTV image based real-time automatic discharge measurement method according to the present invention.

FIG. 2 is a flowchart illustrating a CCTV image based real-time automatic discharge measurement method according to the present invention.

First, consecutive images of a flow velocity measurement site of a stream are acquired (S201).

Subsequently, frames of the consecutive images are dynamically extracted to normalize acquired image data, the extracted frames are image-converted, and homography calculation is performed (S202).

An analysis region of an analysis point is extracted and a pixel flow velocity is calculated through the extracted image in the analysis region of the analysis point (S203).

Subsequently, the calculated pixel flow velocity is converted into an actual flow velocity and discharge calculation is performed using the actual flow velocity (S204).

Water depth information calculated by a positioning filtering process is received, the water depth information is stored in a database through a Web page of a Web server, and the corresponding discharge and water depth information is provided through the Web page of the Web server (S205).

The stream flow velocity measurement using optical flow image processing of the CCTV image based real-time automatic discharge measurement system and method according to the present invention and the stream water depth measurement through positioning data filtering will be described in detail as follows.

The image conversion analysis unit 20 normalizes the image data for the homography calculation due to rotation, scale, and parallelism preservation being generated based on an origin [0,0].

The normalization of the image data means that average X and Y coordinates of input points are calculated, corresponding coordinates are moved to the origin, and a distance between the input points and the average X and Y coordinates is converted.

The homography calculation will be described in detail as follows.

Equation 1 shows a homogeneous form.

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix} \quad \text{[Equation 1]}$$

$$A' = HA$$

Here, x and y denote coordinates before the image conversion, x' and y' denote coordinates after the image conversion, and $h_{11}$, $h_{12}$, $h_{13}$, $h_{21}$, $h_{22}$, $h_{23}$, $h_{31}$, and $h_{32}$ denote parameters required for the image conversion.

Equations 2 and 3 show forms for the homography calculation.

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix} = \begin{bmatrix} h_{11}x + h_{12}y + h_{13} \\ h_{21}x + h_{22}y + h_{23} \\ h_{31}x + h_{32}y + 1 \end{bmatrix} \rightarrow x' = \quad \text{[Equation 2]}$$

$$\frac{h_{11}x + h_{12}y + h_{13}}{h_{31}x + h_{32}y + 1}, \; y' = \frac{h_{21}x + h_{22}y + h_{23}}{h_{31}x + h_{32}y + 1}$$

$$\begin{bmatrix} x_1 & y_1 & 1 & 0 & 0 & 0 & -x_1 x_1' & -y_1 x_1' \\ 0 & 0 & 0 & x_1 & y_1 & 1 & -x_1 y_1' & -y_1 y_1' \\ \cdots & \cdots & \cdots & \cdots & \cdots & \cdots & \cdots & \cdots \\ 0 & 0 & 0 & x_4 & y_4 & 1 & -x_4 y_4' & -y_4 y_4' \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x_1' \\ x_4' \\ \cdots \\ y_4' \end{bmatrix} \Rightarrow \quad \text{[Equation 3]}$$

$$AX = B \Rightarrow X = A^{-1}B$$

In order to calculate a surface flow velocity field to which an optical flow is applied, the pixel flow velocity calculating unit 40 stores images in an array by reading a preset grid setting and declaring the number N of images to be analyzed and the array (a matrix) for storing analysis results and repeats analysis between images as many times as the number of grid points to increase the accuracy of the surface flow velocity field calculation.

In order to calculate a point flow velocity, the pixel flow velocity calculating unit 40 calculates a pixel flow velocity by declaring an image and a grid point parameter and extracting an image at a position of a grid point, determines a grid point position, a pixel flow velocity, and a filter coefficient parameter, and performs filtering when an error calculated when the point flow velocity is calculated is greater than a filter coefficient, to increase the accuracy of the point flow velocity calculation.

The present invention includes the following configuration of pixel flow velocity calculation for calculating the pixel flow velocity through the image of the analysis region on the basis of the analysis point.

It is assumed that a brightness value of an object is not changed even after a short time. A movement of each image is very small so that an equation for calculating the pixel flow velocity may be defined as in Equation 4.

$$I(x,y,t) = I(x+\delta x, y+\delta y, t+\delta t) \quad \text{[Equation 4]}$$

Here, I denotes a contrast value of the pixel in the image, x denotes an X-direction coordinate, y denotes a Y-direction coordinate, t denotes time, and δt denotes an amount of time change.

When a right expression of Equation 4 is expanded as a Taylor series, it is summarized as in the following equation, $$I(x+\delta x, y+\delta y, t+\delta t) = \qquad \text{[Equation 5]}$$
$$I(x, y, t) + \frac{\partial I}{\partial x}\delta x + \frac{\partial I}{\partial y}\delta y + \frac{\partial I}{\partial t}\delta t + .$$

In order to satisfy Equations 4 and 5 at the same time, a sum of the differentials of right expression of Equation 5 should be zero.

$$\frac{\partial I}{\partial x}\delta x + \frac{\partial I}{\partial y}\delta y + \frac{\partial I}{\partial t}\delta t = 0 \qquad \text{[Equation 6]}$$

Therefore, an equation for calculating the pixel flow velocity is defined as follows:

$$\frac{\partial I}{\partial x}\delta x + \frac{\partial I}{\partial y}\delta y + \frac{\partial I}{\partial t}\delta t = 0 \to I_x V_x + I_y V_y = -I_t \qquad \text{[Equation 7]}$$

Here, $I_x$ denotes an X-direction differential matrix of the image, $I_y$ denotes a Y-direction differential matrix of the image, $V_x$ denotes an X-direction pixel velocity, $V_y$ denotes a Y-direction pixel velocity, and $I_t$ denotes a time differential matrix of the image.

In order to obtain the pixel velocity using Equation 7, it is converted into a matrix form as shown in Equation 8 and solved.

$$Av = b \qquad \text{[Equation 8]}$$
$$A = \begin{bmatrix} I_x(q_1) & I_y(q_1) \\ I_x(q_2) & I_y(q_2) \\ \vdots & \vdots \\ I_x(q_n) & I_y(q_n) \end{bmatrix}$$
$$v = \begin{bmatrix} V_x \\ V_y \end{bmatrix}$$
$$b = \begin{bmatrix} -I_t(q_1) \\ -I_t(q_2) \\ \vdots \\ -I_t(q_n) \end{bmatrix}$$

Here, $q_n$ denotes an $n^{th}$ pixel and n denotes the number of pixels in the image.

The process of converting the pixel flow velocity into the actual flow velocity in the actual flow velocity calculating unit 50 is defined as in Equation 9.

$$V_\gamma = V_p \times LPP \times K \qquad \text{[Equation 9]}$$

Here, $V_\gamma$ denotes the actual flow velocity, $V_p$ denotes the pixel flow velocity, LPP denotes a distance per pixel, and K denotes a scale factor.

The distance per pixel is defined as in Equation 10.

$$LPP = \frac{\sum_{i=0}^{N-1} L_r}{\sum_{i=0}^{N-1} L_p} \qquad \text{[Equation 10]}$$

Here, LPP denotes the distance per pixel, N denotes the number of reference points of the image conversion, $L_\gamma$ denotes a physical distance between two neighboring reference points of the image conversion, and $L_p$ denotes a pixel distance between two neighboring reference points of the image conversion.

The scale factor is defined as in Equation 11.

$$K = \frac{D_2}{D_1} \qquad \text{[Equation 11]}$$

Here, K denotes the scale factor, $D_1$ denotes an initial average altitude difference between the sensor and the reference point of the image conversion, and $D_2$ denotes an average altitude difference between the sensor and the reference point of the image conversion.

The flow velocity is calculated using a water depth of the analysis point and the actual flow velocity and the discharge is calculated as illustrated in Equation 12.

$$Q = \sum_{i=0}^{N} A_i V_i \qquad \text{[Equation 12]}$$

Here, Q denotes the flow rate, $A_i$ denotes a unit area of the analysis point, and $V_i$ denotes the flow velocity of the analysis point.

The actual flow velocity calculation method will be described in detail as follows.

Figure 3:
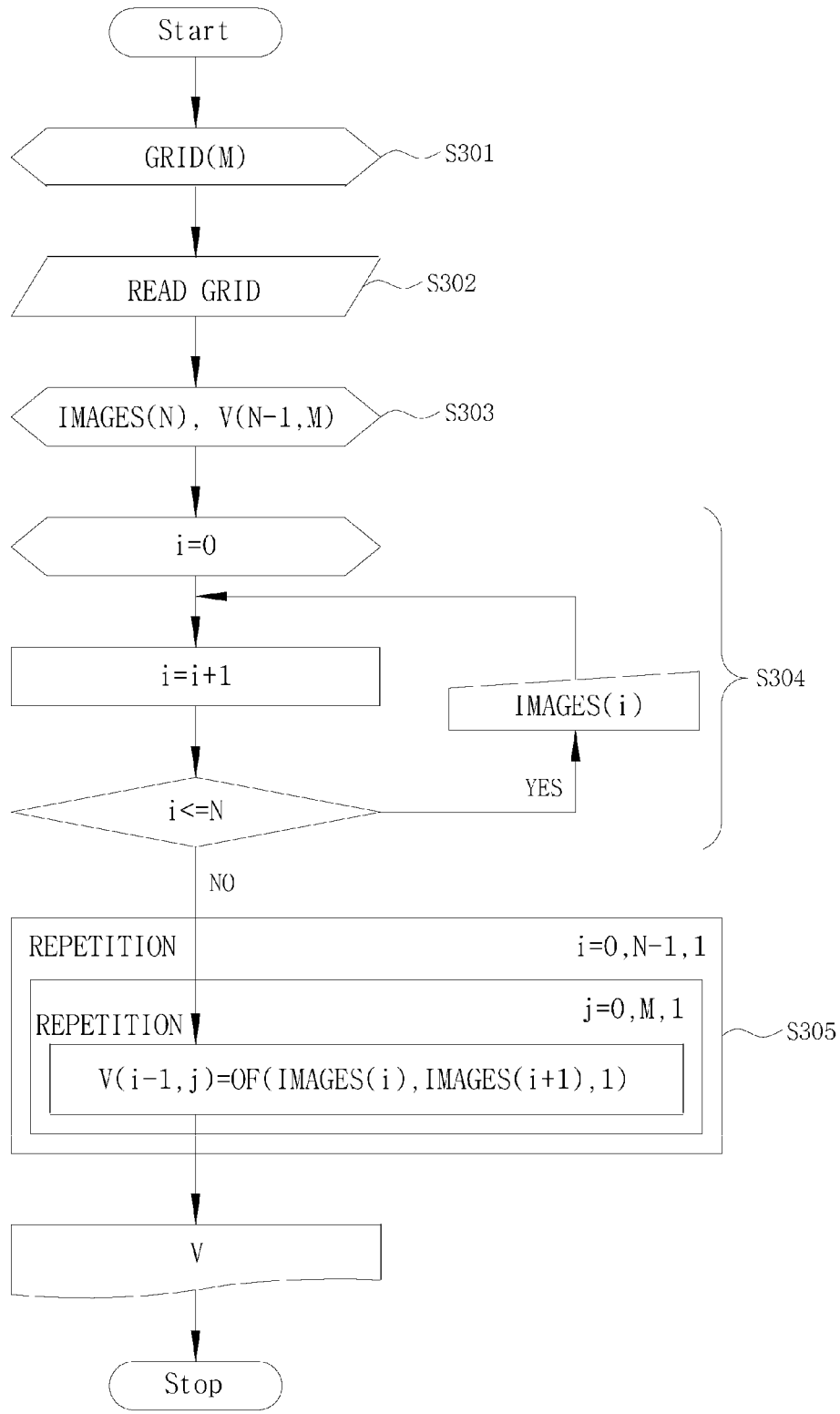
FIG. 3 is a flowchart illustrating a method of calculating a surface flow velocity field using an optical flow according to the present invention.
Figure 4:
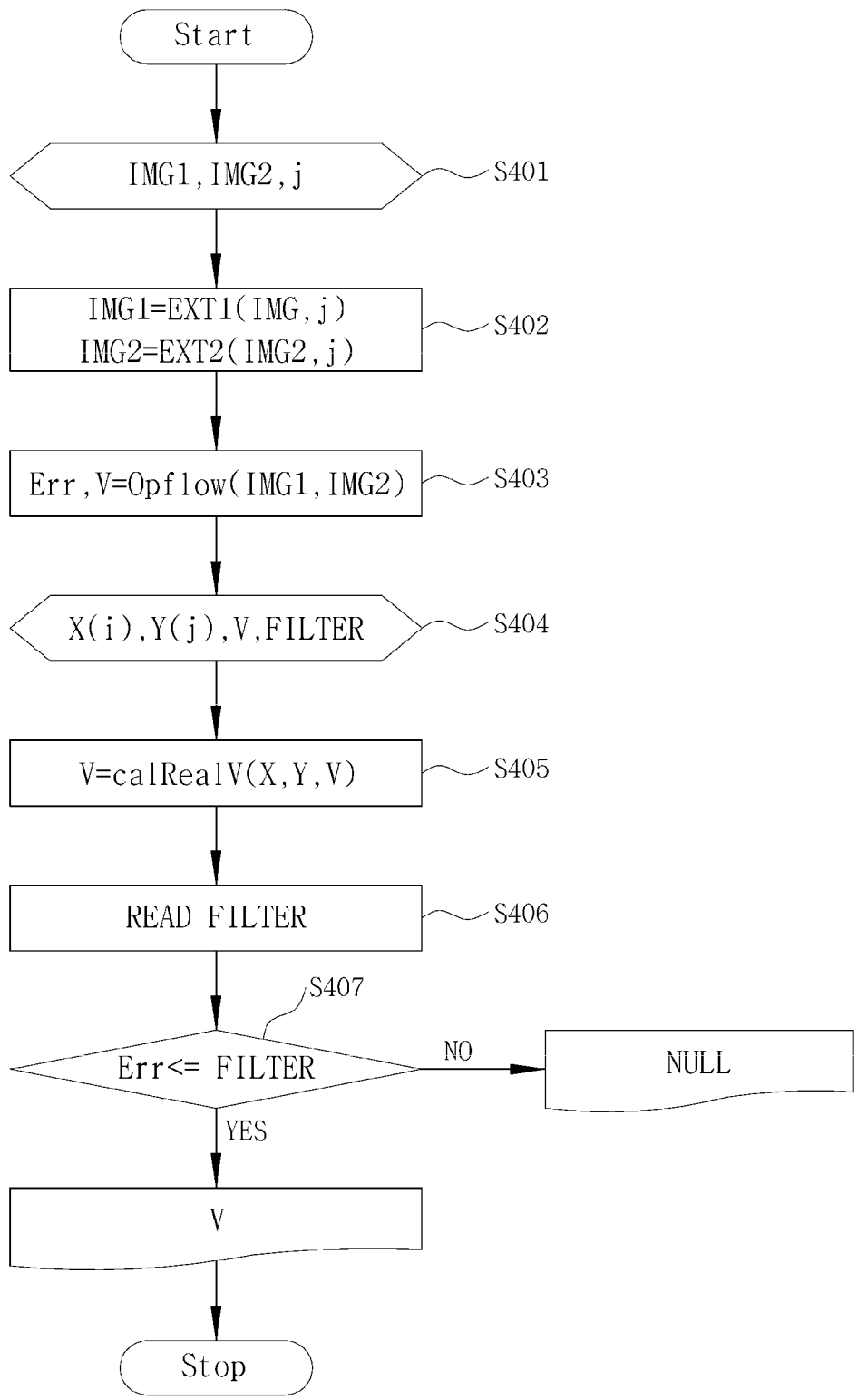
FIG. 4 is a flowchart illustrating a method of calculating a point flow velocity according to the present invention.

FIG. 3 is a flowchart illustrating a method of calculating a surface flow velocity field using an optical flow according to the present invention, and FIG. 4 is a flowchart illustrating a method of calculating a point flow velocity according to the present invention.

The flow velocity measurement method using optical flow image processing according to the present invention includes an image photographing operation of acquiring consecutive images of a flow velocity measurement site of a stream, an image conversion analyzing operation of dynamically extracting frames of the consecutive images, image-converting the extracted frames and performing homography calculation in order to normalize image data acquired in the image photographing operation, an analysis region extracting operation of extracting an analysis region of an analysis point, a pixel flow velocity calculating operation of calculating a pixel flow velocity through the image in the analysis region of the analysis point extracted in the analysis region extracting operation, and an actual flow velocity calculating operation of converting the pixel flow velocity calculated in the pixel flow velocity calculating operation into an actual flow velocity.

Here, in the pixel flow velocity calculating operation, first, in order to calculate a surface flow velocity field to which an optical flow is applied, a grid parameter including M points to be analyzed is defined as illustrated in FIG. 3 (S301).

Subsequently, a preset grid setting is read (S302) and the number N of images to be analyzed and an array (a matrix) for storing analysis results are declared (S303).

Images photographed by a camera are stored in the array (S304).

The analysis between images is repeated as many times as the number of grid points and the analysis results are stored in the array (S305).

In the pixel flow velocity calculating operation, the image and the grid point parameter are declared to calculate a point flow velocity, as illustrated in FIG. 4 (S401), and the image is extracted at a grid point position (S402).

Subsequently, an optical flow pixel flow velocity calculation algorithm is applied (S403), a grid point position parameter, a pixel flow velocity parameter, and a filter coefficient parameter are declared (S404), and the grid point position and the pixel flow velocity are converted into an actual flow velocity (S405).

When the calculated flow velocity error is greater than the filter coefficient, filtering is performed. Otherwise, a result of the flow velocity calculation is output so that the accuracy of the point flow velocity calculation is increased (S406).

Figure 5:
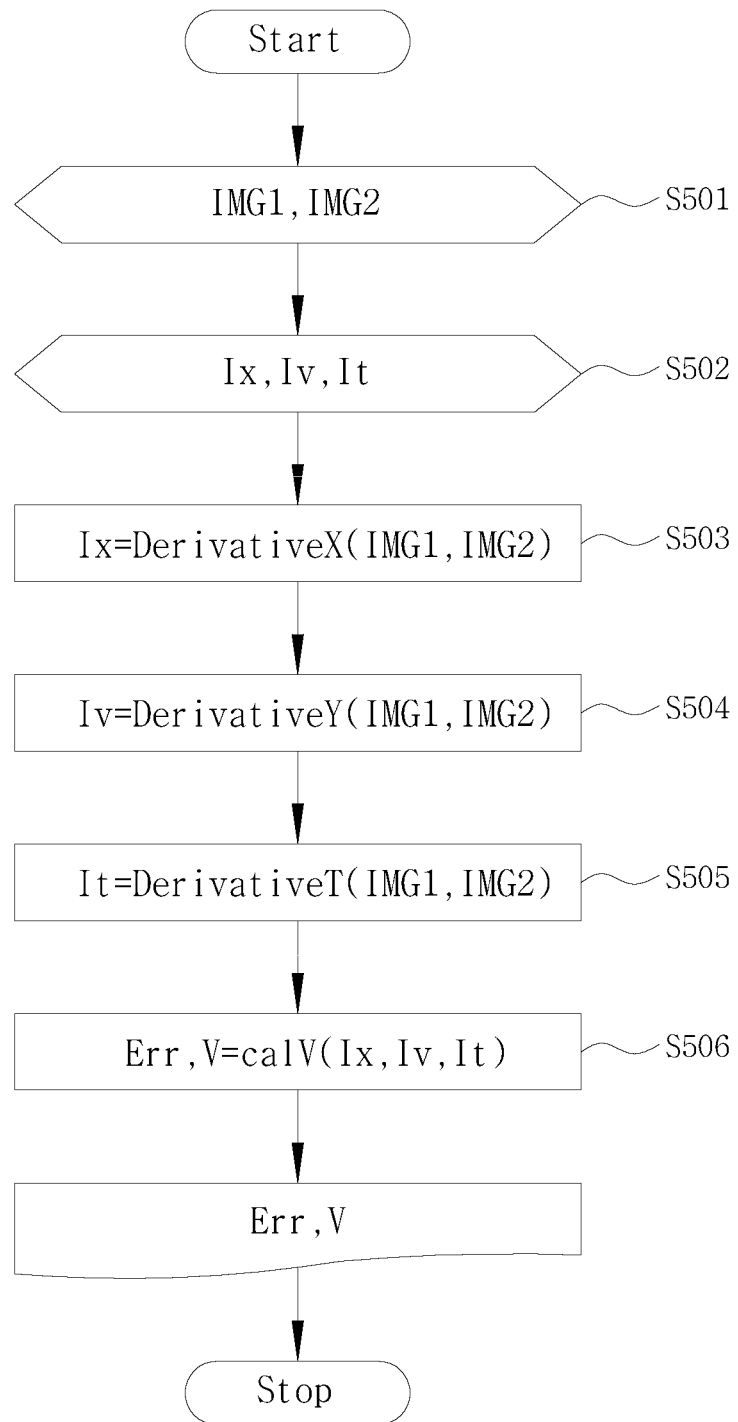
FIG. 5 is a flowchart illustrating a method of calculating a pixel flow velocity according to the present invention.
Figure 6:
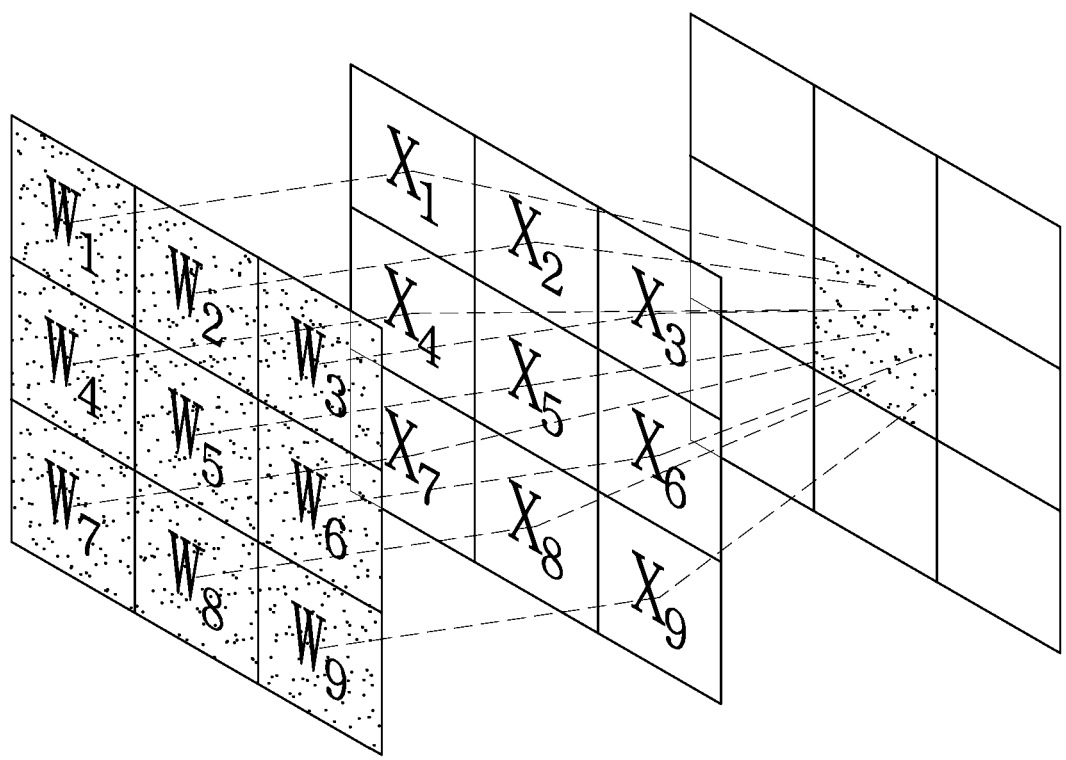
FIGS. 6 and 7 are differential functions when a pixel flow velocity is calculated according to the present invention.
Figure 7:
Figure 7:
Figure 7:
Figure 7:

FIG. 5 is a flowchart illustrating a method of calculating a pixel flow velocity according to the present invention, and FIGS. 6 and 7 are differential functions when a pixel flow velocity is calculated according to the present invention.

In the pixel flow velocity calculating operation, as illustrated in FIG. 5, an image parameter is declared (S501), and an X-direction parameter, a Y-direction parameter, and a time differential parameter are declared (S502).

An X-direction image differential is performed (S503), a Y-direction image differential is performed (S504), a time direction image differential is performed (S505), and thus the pixel flow velocity is calculated (S506).

When the flow velocity is measured using optical flow image processing according to the present invention having such a configuration, image coordinates of a reference point viewed by a camera are allowed not to be changed by applying a method for image distortion correction in consideration of a change in stream water depth even when the water depth changes, and errors of the measured actual coordinates and conversion results are allowed not to be generated, and thus the image distortion is allowed to be accurately corrected.

Figure 8:
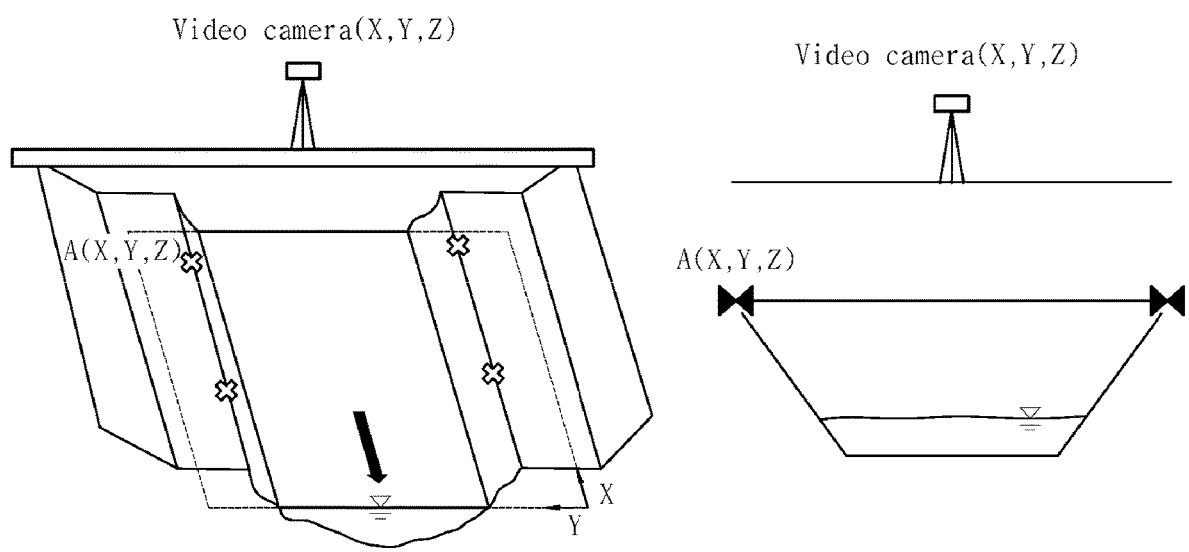
FIGS. 8 to 10 are configuration diagrams illustrating a method of correcting image distortion in consideration of a change in stream water depth.
Figure 9:
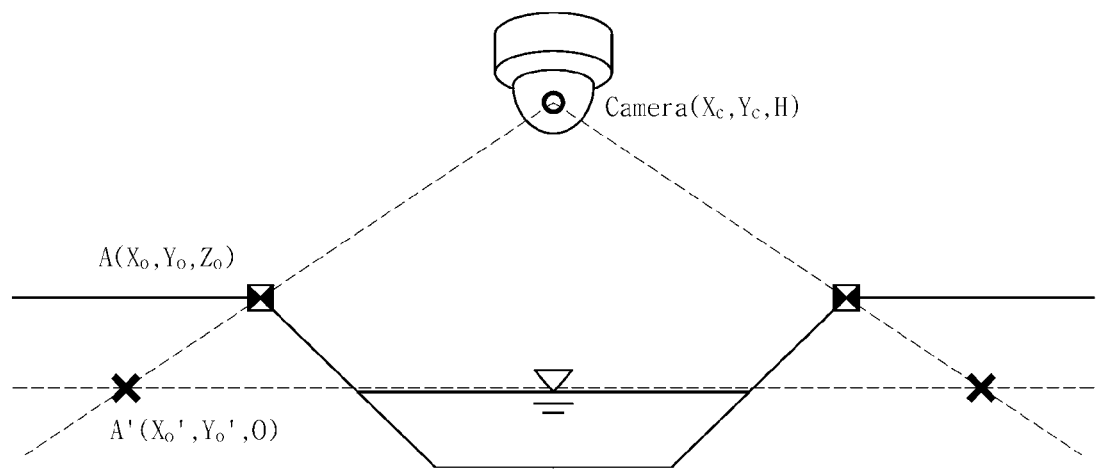
Figure 10:
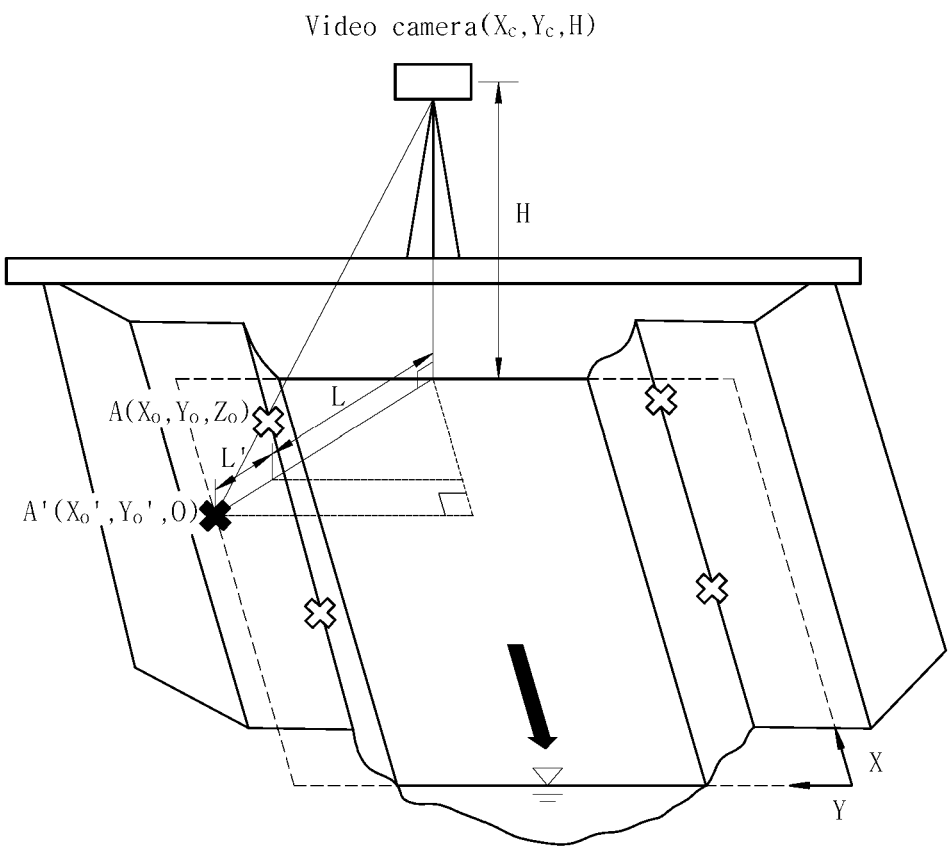

FIGS. 8 to 10 are configuration diagrams illustrating a method of correcting image distortion in consideration of a change in stream water depth.

The method of correcting image distortion is a method of easily and accurately correcting image distortion using four reference points. In the method, in order to consider the water depth change, four reference points are installed at a height of a bank as illustrated in FIG. 8 so that all the reference points at the height of the bank may be photographed.

With such a configuration, even when the water depth is changed as illustrated in FIG. 9, coordinates of an image of the reference point viewed by a camera are not changed.

As illustrated in FIG. 10, actual coordinates $(X'_0, Y'_0, Z'_0)$ of a point A' at the same height as the water surface may be obtained using actual coordinates $(X_c, Y_c, H)$ of the camera, a height (H) from the camera to the water surface, and actual coordinates $(X_0, Y_0, Z_0)$ of a reference point A on the bank.

$$X'_0 = X_c + (L+L')\frac{X_0 - X_c}{L} = X_c + \frac{H}{H - Z_0}(X_0 - X_c) \quad \text{[Equation 13]}$$

-continued
$$Y'_0 = Y_c + (L+L')\frac{Y_0 - Y_c}{L} = Y_c + \frac{H}{H - Z_0}(Y_0 - Y_c)$$

Here, equations, $$L = \sqrt{(X_C - X_0)^2 + (Y_C - Y_0)^2},$$

$$L' \rightarrow H:(L+a) = Z_0:a,$$

and $$L' = \frac{LZ_o}{(H - Z_o)},$$

are satisfied.

The stream water depth measurement using positioning data filtering in the CCTV image based real-time automatic discharge measurement system and method according to the present invention will be described in detail as follows.

For the positioning data filtering, the present invention includes a positioning data filtering unit for increasing accuracy by filtering the positioning data received from the water depth measuring unit using a local linear regression-based bivariate scatterplot smoothing technique through adaptive bandwidth application.

Figure 11:
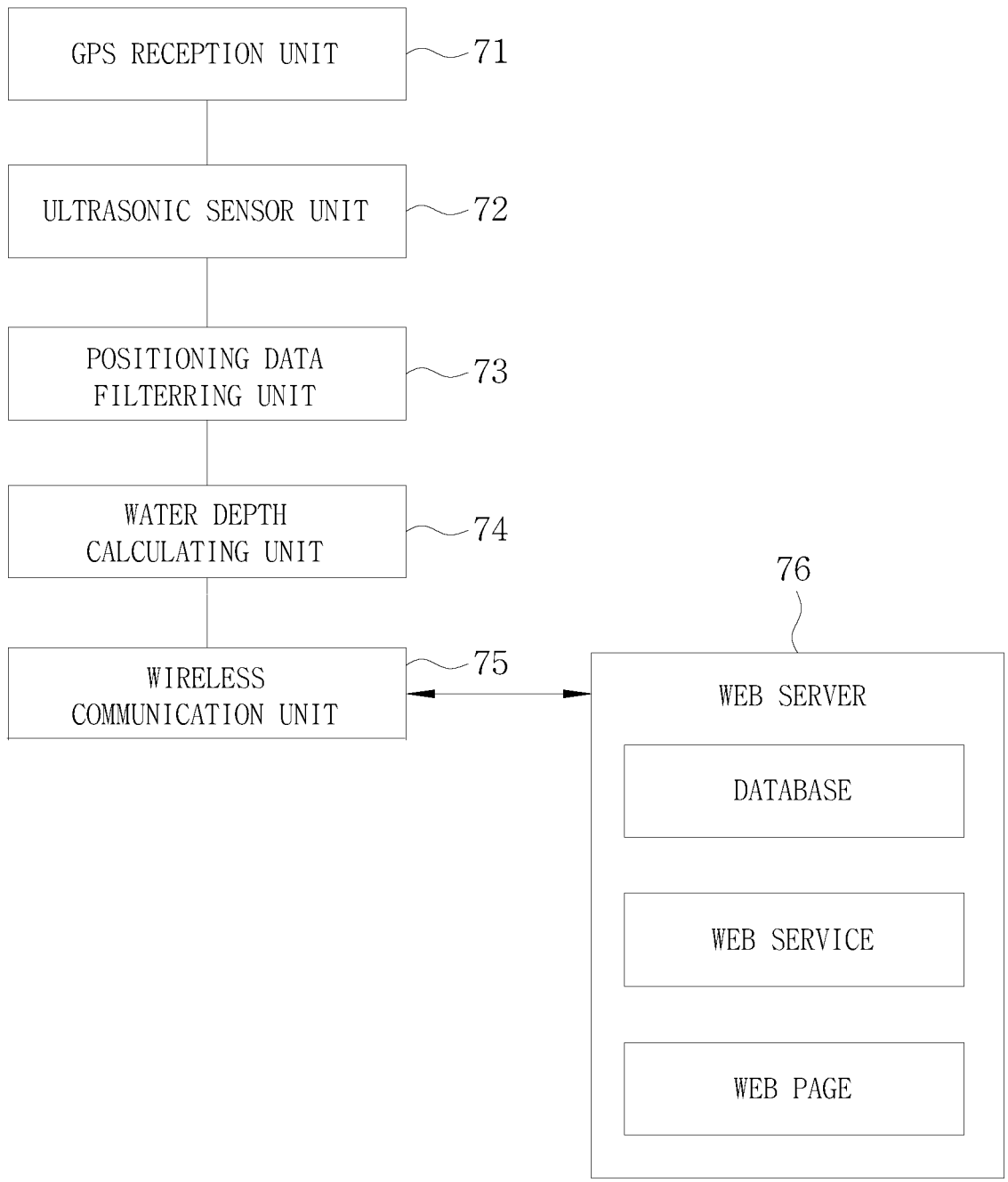
FIG. 11 is a configuration diagram of a real-time stream water depth measurement device using positioning data filtering of a real-time automatic discharge measurement system according to the present invention.

FIG. 11 is a configuration diagram of a real-time stream water depth measurement device using positioning data filtering of a real-time automatic discharge measurement system according to the present invention.

As illustrated in FIG. 11, the real-time stream water depth measurement device according to an embodiment of the present invention includes a Global Positioning System (GPS) reception unit 71 which receives GPS information according to an installation position of the stream water depth measurement device from a GPS satellite, an ultrasonic sensor unit 72 which transmits ultrasonic waves to a surface of a measurement target, receives reflected waves formed by the transmitted ultrasonic waves being reflected from the surface of the measurement target and being returned, and measures a distance from the surface of the measurement target on the basis of a time difference between an ultrasonic transmission time and a reflected wave reception time, an ultrasonic transmission velocity, a reflection velocity of the reflected wave, and the like, a positioning data filtering unit 73 which filters the positioning data of the ultrasonic sensor unit 72 to minimize uncertainty of the water depth measurement due to the rough water surface ripples of a small stream, a water depth calculating unit 74 which calculates a water depth, which is a distance from a bottom of the measurement target to the water surface of the measurement target, using altitude information included in the GPS information received from the GPS reception unit 71, distance information filtered by the positioning data filtering unit 73 and measured by the ultrasonic sensor unit 72, and distance information between a structure and the bottom of the measurement target, a wireless communication unit 75 which enables wireless communication with an external communication device to transmit the water depth information of the measurement target calculated by the water depth calculating unit 74 and the GPS information according to the measurement position received by the GPS reception unit 71 to the external communication device in a wireless manner, and a Web server 76 which receives the calculated water depth information through the wireless communication unit 75, stores the calculated water depth information in a database using a Web service, and provides the corresponding result through a Web page.

Here, the GPS reception unit 71 receives position information about a position at which the stream water depth measurement device is installed and provides the position information about the corresponding position when the water depth information of the measurement target is provided at the corresponding position.

The GPS information includes all of position information composed of latitude and longitude coordinates values, altitude information representing an altitude, time information composed of date and time, and the like.

The Web service of the Web server 76 includes an application programming interface (API) that can retrieve and provide the water depth information.

The distance information between the structure and the bottom of the measurement target may be replaced with any information that can calculate the water depth of the measurement target when only the altitude information received from the GPS reception unit 71 and the distance information measured by the ultrasonic sensor unit 72 are present.

The wireless communication unit 75 may transmit the water depth information of the measurement target and the GPS information corresponding to the water depth information to an external communication device such as a laptop computer, a smart phone, or a tablet PC using Wi-Fi communication, mobile communication, near field communication, or wireless Internet communication so as to separately store or analyze the water depth information.

The external communication device may be a stream information management server that comprehensively manages the stream information and may use wired communication to increase stability rather than wireless communication.

The real-time stream water depth measurement device using positioning data filtering according to the present invention is installed in the middle of a bridge of the stream and may be installed to transmit data by connecting continuous power and the Internet.

A measurement range of the ultrasonic water depth sensor of the ultrasonic sensor unit 72 may be 5 m or more in consideration of a height from the bridge to the stream bed, a minimum measurement time interval may be less than 10 seconds, and the resolution may be less than 1 mm.

The stream water depth measurement device installed as described above may include a stream water depth measurement device based on Arduino using an open source based single board microcontroller so that the development and application environments may be improved.

In addition, the real-time stream water depth measurement device according to the present invention should operate stably even under sudden heavy rains and thus should have a structure that is highly waterproof and dustproof.

In particular, the stream water depth measurement device should be durable such that it can be operated for real-time small stream measurement without interruption and may be firmly installed to ensure normal operation even under extreme conditions such as lightning, typhoon, or heavy rain, and thus all devices or facilities may be arranged for maximum performance to minimize obstacles.

The detailed configuration of the positioning data filtering unit according to the present invention will be described as follows.

Figure 12:
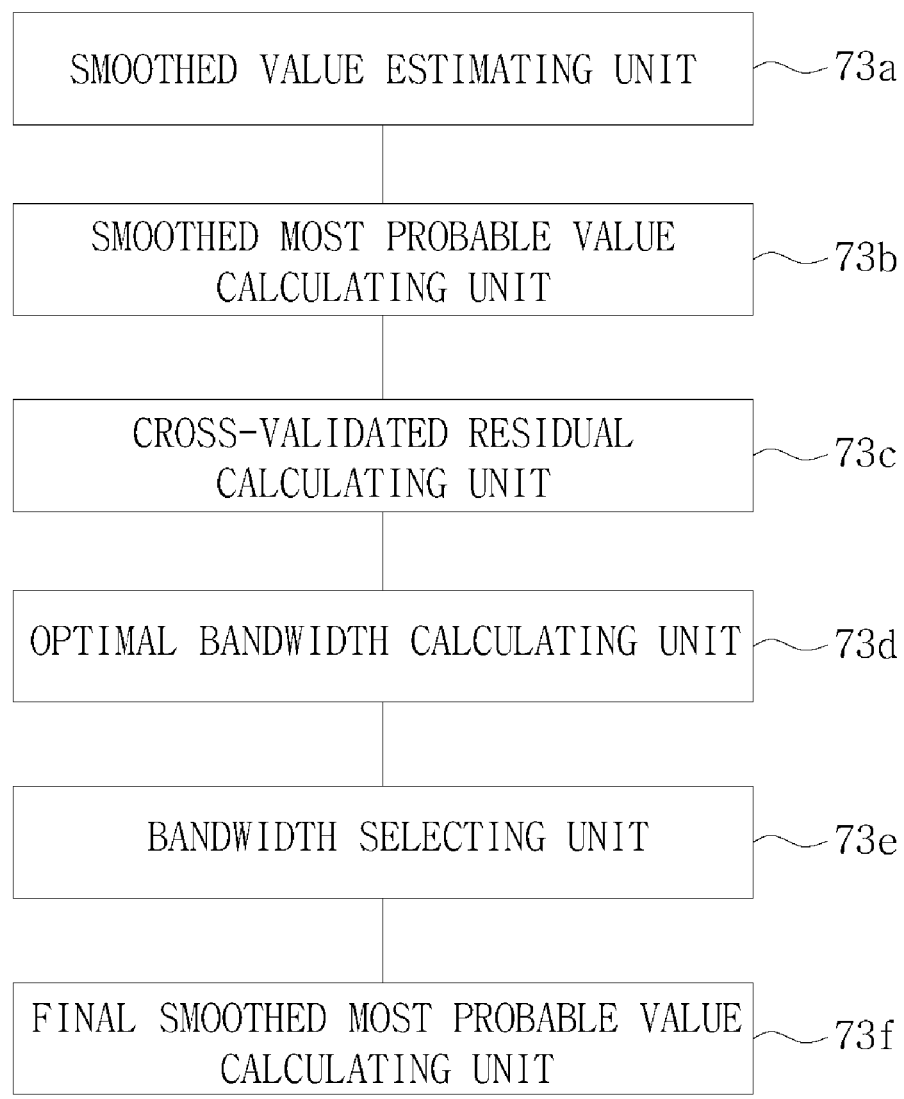
FIG. 12 is a detailed configuration diagram of a positioning data filtering unit according to the present invention.

FIG. 12 is a detailed configuration diagram of the positioning data filtering unit according to the present invention.

The positioning data filtering unit 73 according to the present invention includes a smoothed value estimating unit 73*a* which estimates a smoothed value at an arbitrary position in the positioning data received by the ultrasonic sensor, a smoothed most probable value calculating unit 73*b* which calculates a plurality of smoothed most probable values for an initial fixed bandwidth such that a square of the estimated error is minimized, a cross-validated residual calculating unit 73*c* which calculates a cross-validated residual for each bandwidth, an optimal bandwidth calculating unit 73*d* which calculates an optimal bandwidth for each point, a bandwidth selecting unit 73*e* which selects a bandwidth close to the optimal bandwidth among initially input bandwidths, and a final smoothed most probable value calculating unit 73*f* which calculates a final smoothed most probable value by linear interpolation using the smoothed most probable value.

The positioning data filtering according to the present invention will be described in detail as follows.

Generally, a large amount of measurement data measured and inspected is represented as scatterplots with (x, y) type bivariate parameters, and the qualitative trends are analyzed by deriving mathematical stroke lines through linear or nonlinear regression.

However, it is often impossible to derive quantitative mathematical stroke lines due to a lack of correlation between a large number of time series measurement data or parameters outside a local domain.

In this case, smoothing techniques have been mainly applied in which the fluctuations caused by random behavior are removed, local trends are reflected, and then overall strokes are derived.

These techniques may basically use a least-squares method to estimate a most probable value on the basis of surrounding local data (local linear regression) and then link the estimated value to smooth scatterplots and track trends (scatterplot smoothing).

As a representative scattering smoothing technique, there is locally weighted scatterplot smoothing (LOWESS) or locally estimated scatterplot smoothing (LOESS), which uses locally divided data based on a fixed bandwidth (or window).

In the present invention, in order to improve the reliability of positioning data filtering, an adaptive bandwidth is calculated by reflecting the characteristics of the local data, thereby improving accuracy and processing efficiency, which is a disadvantage of the LOWESS.

The positioning data filtering unit 73 of the present invention divides bivariate data by the elastic bandwidth and calculates a most probable value by applying weighted linear regression in each section.

The positioning data filtering unit 73 estimates the most probable values by repeating the same task at all x positions or given spans, and connects the x positions to obtain a smoothed stroke curve.

The basis of scatterplot smoothing is the bandwidth width setting and the weighted least-squares method.

The bandwidth refers to a region for designating only a part of the scatterplot, a certain range (width) of data is selected and used for calculation based on a value of an x parameter of one object, and another bandwidth is set based on a value of an x parameter of a next object.

That is, the bandwidth is used as a means for estimating a local pattern.

In the case of the LOWESS method, a bandwidth represented by a size of a fixed bandwidth is used as a number between ⅓ and ⅔ of all data at a corresponding position.

In this case, when the bandwidth is too large, a regression function appears as a flat curve similar to a straight line (under-fitting), and when the bandwidth is small, the regression function appears as a curve having a large degree of bending (over-fitting).

Therefore, it is important to specify the appropriate bandwidth for the purpose of use.

A filtering algorithm applied to the positioning data filtering unit 73 according to the present invention will be described in detail as follows.

First, in the smoothed value estimating unit 73a, $\hat{f}(x_i)$ which is a smoothed value (or a most probable value) at an arbitrary position $x_i$ in scatterplots, is estimated by local regression using a least-squares method as follows.

$$\hat{E}[Y|x_i] = \hat{\alpha} + \hat{\beta} x_j, x_j \in N_i \qquad \text{[Equation 14]}$$

Here, N denotes a local bandwidth around $x_i$ and is optimized for each position.

When a specific bandwidth J is given and the number of parameters in the bandwidth is N, a local linear regression tracker is obtained by Equation 15 below.

$$\hat{y}_k = \hat{\alpha} + \hat{\beta} x_k, k=1, \ldots, N \qquad \text{[Equation 15]}$$

Here, $\hat{\alpha}$ and $\hat{\beta}$ may be obtained by linear regression of local data which is present in $i_{-J/2}, \ldots i_{+J/2}$, and $\hat{y}_i$ becomes a smoothed most probable value corresponding to the position $x_i$.

The bandwidth J is not fixed and an additional task proceeds as follows.

In order to calculate a smoothed most probable value that is linked to a locally adaptive bandwidth, in a filtering algorithm (Friedman's Super Smoother) according to the present invention, when an observation value of y=f(x), and a bandwidth of J(x) are given at the x position, a basic principle is to calculate J(x) and f(x) such that a square of an estimation error is minimized, as shown in Equation 16.

$$e^2(f,J) = E[Y - f(X|J(X))]^2 \qquad \text{[Equation 16]}$$

In order to minimize Equation 16 in the smoothed most probable value calculating unit 73b, when the number of pieces of whole data is n, a plurality of smoothed most probable values, f(x), are calculated by applying Equation 15 to initial fixed bandwidths, J, of various sizes between 0<j<n, and a cross-validated residual is calculated for each bandwidth, J, by the cross-validated residual calculating unit 73c as follows.

[Equation 17]

$$r_{(i)(J)} = [y_i - \hat{f}(x_i | J)] \bigg/ \left(1 - \frac{1}{J} - \frac{(x_i - x_J)^2}{V_J}\right)$$

In this case, equations, $$V_J = \frac{1}{n} \sum_{j=i-J/2}^{i+J/2} (x_i - x_J)^2,$$

$$x_J = \frac{1}{J} \sum_{j=i-J/2}^{i+J/2} x_i,$$

are satisfied.

Equation 18 below is used to derive $\hat{e}(f,J|x_i)$ as a result of smoothing $|r_{(i)(J)}|$ derived using Equation 17 for $x_i$ having a bandwidth of J=0.2n and to calculate an optimal bandwidth $J_{cv}(x_i)$ at each point in the optimal bandwidth calculating unit 73d.

Equation 18 means that a value of J corresponding to $\hat{e}_{min}$ in among derived maximum errors ê for a plurality of bandwidths J at a specific position $x_i$, becomes the optimal bandwidth $J_{cv}$.

$$\hat{e}(f,J_{cv}|x_i) = \min \hat{e}(f,J|x_i) \qquad \text{[Equation 18]}$$

$J_{cv}(x_i)$ for each position $x_i$ is re-smoothed with a bandwidth of J=0.2n, and then a bandwidth close to $J_{cv}(x_i)$ among the initially input bandwidths by the bandwidth selecting unit 73e is selected as in Equation 19.

$$I_{j1} \leq J_{cv}(x_i) \leq J_{i2} \qquad \text{[Equation 19]}$$

When smoothed most probable values corresponding to two initial bandwidths $J_{i1}$, $J_{i2}$ which are selected for $x_i$ previously obtained in the final smoothed most probable value calculating unit 73f are $y^*_{i1}$, $y^*_{i2}$, respectively, $y^*_i$ is obtained using the two values by linear interpolation as follows.

$$y^*_i = (y^*_{i1} - y^*_{i2})/(J_{i1} - J_{i2})(J^*_{cv}(x_i) - J_{i2}) + y^*_{i2}$$

The final smoothed most probable value $y^*_i$ corresponding to the position $x_i$ reuses the value smoothed with a bandwidth of J=0.5n.

Using such a positioning data filtering algorithm, measured stream water depth data may be filtered and even when the measured stream water depth data is applied to a small stream having a small basin area and a steep slope and thus the reliability of the measured water depth data may be ensured.

A real-time stream water depth measurement method using positioning data filtering according to the present invention will be described in detail as follows.

Figure 13:
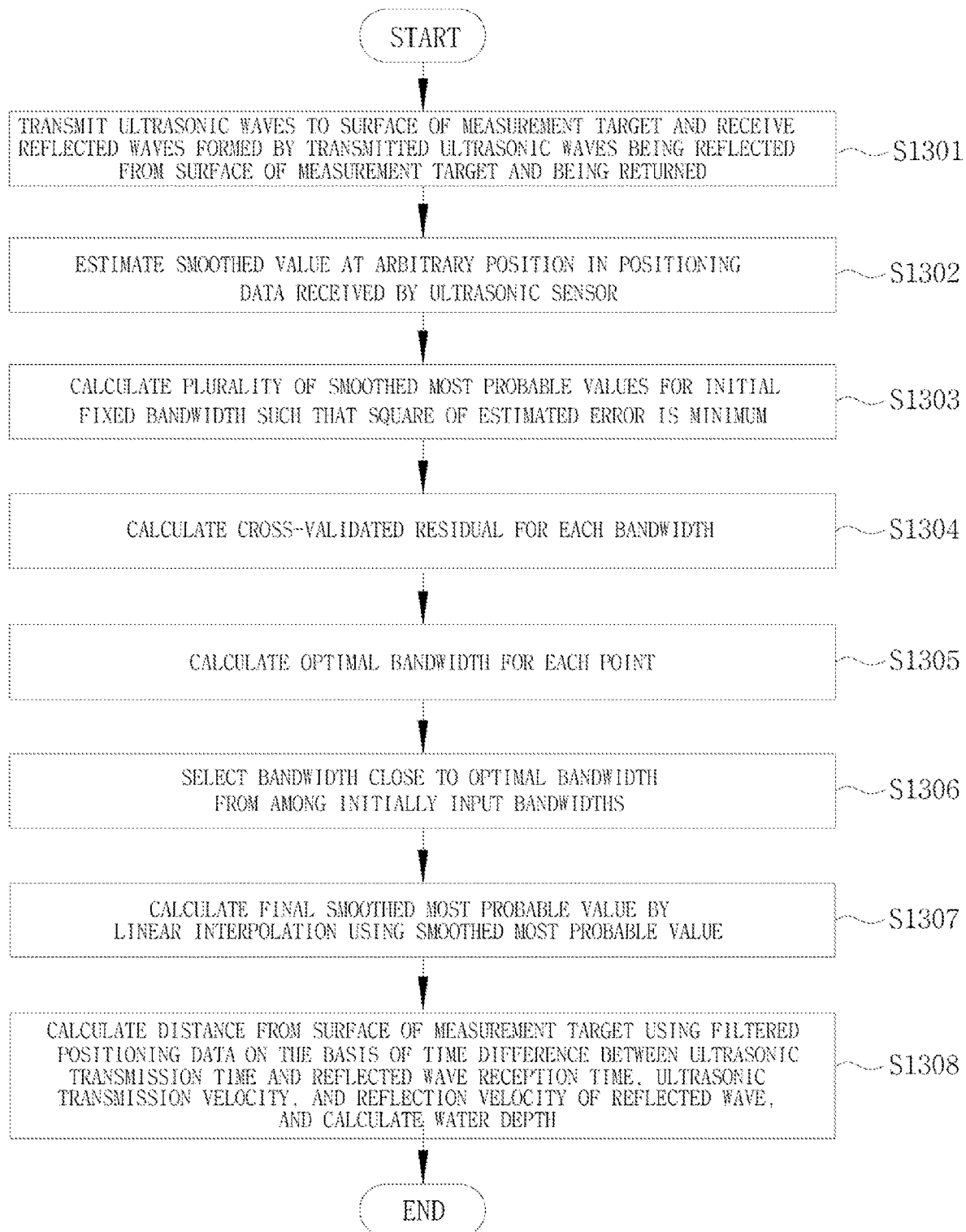
FIG. 13 is a flowchart illustrating a real-time stream water depth measurement method using positioning data filtering of a real-time automatic discharge measurement system according to the present invention.

FIG. 13 is a flowchart illustrating a real-time stream water depth measurement method using positioning data filtering of the real-time discharge measurement system according to the present invention.

First, ultrasonic waves are transmitted to a surface of a measurement target and reflected waves formed by the transmitted ultrasonic waves being reflected from the surface of the measurement target and being returned are received (S1301).

Subsequently, a smoothed value at an arbitrary position in positioning data received by an ultrasonic sensor is estimated (S1302), a plurality of smoothed most probable values for an initial fixed bandwidth are calculated such that a square of an estimated error is minimum (S1303), and a cross-validated residual is calculated for each bandwidth (S61304).

Subsequently, an optimal bandwidth is calculated for each point (S1305), and a bandwidth close to an optimal bandwidth is selected from among initially input bandwidths (S1306).

A final smoothed most probable value is calculated by linear interpolation using the smoothed most probable value (S1307).

Subsequently, a distance from a surface of a measurement target is calculated using the filtered positioning data on the basis of a time difference between an ultrasonic transmission time and a reflected wave reception time, an ultrasonic transmission velocity, a reflection velocity of the reflected wave, and the like, and a water depth is calculated (S1308).

The calculated water depth information is stored in a database using a Web service of a Web server and the corresponding result is provided through a Web page of the Web server (S1309).

The water depth information calculated by filtering may be transmitted to a system controller and a server PC in a wired or wireless manner to be utilized as input data of an automatic discharge measurement program and may be used to be checked in real time using a real-time water depth and discharge display Web service.

The CCTV image based real-time automatic discharge measurement system and method according to the present invention described above include a configuration for continuous unmanned measurement of hydraulic and hydrology data such as flow velocity and water depth of small streams, real-time collecting hydraulic and hydrology data measurement results and measuring flow rate, and transmitting and displaying a real-time discharge measurement result based on the Web, wherein the system and method provide a site image for coping with a situation in real time and collect water depth and flow velocity information through image-based automatic discharge measurement optimized to a small stream to measure a discharge in real time.

While the present invention has been particularly described with reference to exemplary embodiments, it will be understood by those skilled in the art that various changes in form and details may be made without departing from the spirit and scope of the present invention.

Therefore, the exemplary embodiments should be considered in a descriptive sense only and not for purposes of limitation. The scope of the invention is defined not by the detailed description of the invention but by the appended claims and encompasses all modifications and equivalents that fall within the scope of the appended claims and will be construed as being included in the present invention.

The present invention relates to a closed-circuit television (CCTV) image based real-time automatic discharge measurement system and method, which provide a site image for coping with a situation in real time and collect water depth and flow velocity information through image-based automatic discharge measurement optimized to a small stream to measure a discharge in real time.

The invention claimed is:

1. A closed-circuit television (CCTV) image based real-time automatic discharge measurement system, the system comprising:
    a water depth measurement device configured to filter water depth data measured by a measurement unit using a local linear regression-based bivariate scatter-plot smoothing technique through adaptive bandwidth calculation to calculate a water depth of a stream;
    an image acquisition device configured to acquire consecutive images of a flow velocity measurement site of the stream;
    an image analysis personal computer (PC) configured to measure a surface flow velocity in real time using the images of the image acquisition device and receive the calculated water depth of the stream from the water depth measurement device to measure a discharge in real time with cross-section data; and
    a discharge calculation and management server configured to transmit and display a real-time discharge measurement result based on a Web server,
    wherein the adaptive bandwidth calculation is a Friedman's Super Smoother filtering algorithm,
    wherein the cross-section data is measured using a cross-correlation method searching for similarity of contrast value distribution within a correlation region, and
    wherein the water depth measurement device, the measurement unit, and the image acquisition device are each implemented via at least one processor.

2. The system of claim 1, wherein the water depth measurement device includes:
    a Global Positioning System (GPS) reception unit configured to receive GPS information according to an installation position of a stream water depth measurement device from a GPS satellite;
    an ultrasonic sensor unit configured to transmit ultrasonic waves to a surface of a measurement target, receive reflected waves formed by the transmitted ultrasonic waves being reflected from the surface of the measurement target and being returned, and measure a distance from the surface of the measurement target on a basis of a time difference between an ultrasonic transmission time and a reflected wave reception time, an ultrasonic transmission velocity, and a reflection velocity of the reflected wave;
    a positioning data filtering unit configured to filter positioning data of the ultrasonic sensor unit and minimize uncertainty of the water depth of the stream due to rough water surface ripples of a small stream; and
    a water depth calculating unit configured to calculate a water depth, which is a distance from a bottom of the measurement target to a water surface of the measurement target, using altitude information included in the GPS information received from the GPS reception unit, distance information filtered by the positioning data filtering unit and measured by the ultrasonic sensor unit, and distance information between a structure and the bottom of the measurement target,
    wherein the GPS reception unit, the ultrasonic sensor unit, the positioning data filtering unit, and the water depth calculating unit are each implemented via at least one processor.

3. The system of claim 2, wherein the positioning data filtering unit includes:
    a smoothed value estimating unit configured to estimate a smoothed value at an arbitrary position in the positioning data;
    a smoothed most probable value calculating unit configured to calculate a plurality of smoothed most probable values for an initial fixed bandwidth such that a square of an estimated error is minimum;
    a cross-validated residual calculating unit configured to calculate a cross-validated residual for each bandwidth;
    an optimal bandwidth calculating unit configured to calculate an optimal bandwidth for each point;
    a bandwidth selecting unit configured to select a bandwidth close to an optimal bandwidth from among initially input bandwidths; and
    a final smoothed most probable value calculating unit configured to calculate a final smoothed most probable value by linear interpolation using the plurality of smoothed most probable values,
    wherein the smoothed value estimating unit, the smoothed most probable value calculating unit, the cross-validated residual calculating unit, the optimal bandwidth calculating unit, the bandwidth selecting unit, and the final smoothed most probably value calculating unit are each implemented via at least one processor.

4. The system of claim 1, wherein the image analysis PC includes:
    an image conversion analysis unit configured to dynamically extract frames of the consecutive images in order to normalize image data of the image acquisition device, image-convert the extracted frames, and perform a homography calculation;

an analysis region extracting unit configured to extract an analysis region of an analysis point;

a pixel flow velocity calculating unit configured to calculate a pixel flow velocity using an image in the analysis region of the analysis point extracted by the analysis region extracting unit;

an actual flow velocity calculating unit configured to convert the pixel flow velocity calculated by the pixel flow velocity calculating unit into an actual flow velocity;

a water depth measuring unit configured to filter the measured water depth data to calculate a water depth of the stream; and a discharge calculating unit configured to perform a real-time discharge calculation using the actual flow velocity of the actual flow velocity calculating unit and the water depth of the stream of the water depth measuring unit, wherein the image conversion analysis unit, the analysis region extracting unit, the pixel flow velocity calculating unit, the actual flow velocity calculating unit, the water depth measuring unit, and the discharge calculating unit are each implemented via at least one processor.

5. The system of claim 4, wherein, in order to perform the homography calculation, the image conversion analysis unit calculates average X and Y coordinates of input points, moves corresponding coordinates to an origin, converts a distance between the input points and the average X and Y coordinates, and normalizes image data.

6. The system of claim 4, wherein, in order to calculate a surface flow velocity field to which an optical flow is applied, the pixel flow velocity calculating unit reads a preset grid setting, declares a number (N) of the images of the image acquisition device to be analyzed and an array for storing analysis results, stores the images of the image acquisition device in the array, and calculates the surface flow velocity field by repeating analysis between images as many times as a number of grid points.

7. The system of claim 4, wherein, in order to calculate a point flow velocity, the pixel flow velocity calculating unit calculates the pixel flow velocity by declaring an image parameter and a grid point parameter and extracting an image at a grid point position, and calculates the point flow velocity by declaring a grid point position parameter, a pixel flow velocity parameter, and a filter coefficient parameter and performing filtering when a calculated flow velocity error is greater than a filter coefficient.

8. The system of claim 4, wherein, in order to correct distortion of the images acquired by the image acquisition device, four reference points are installed at a height of a bank such that coordinates of an image of a reference point viewed by a camera are not changed even when a water depth is changed, and actual coordinates $(X'_0, Y'_0, Z'_0)$ of a point (A') at a same height as a water surface are obtained using actual coordinates $(X_c, Y_c, H)$ of the camera, a height (H) from the camera to the water surface, and actual coordinates $(X_0, Y_0, Z_0)$ of a reference point (A) on the bank.

9. A closed-circuit television (CCTV) image based real-time automatic discharge measurement method, the method comprising:

an operation of acquiring consecutive images of a flow velocity measurement site of a stream;

an image conversion analyzing operation of dynamically extracting frames of the consecutive images, image-converting the extracted frames, and performing a homography calculation in order to normalize acquired image data;

an operation of extracting an analysis region of an analysis point and calculating a pixel flow velocity through an extracted image in the analysis region of the analysis point;

an operation of converting the calculated pixel flow velocity into an actual flow velocity and calculating a discharge using the actual flow velocity; and an operation of receiving water depth information calculated by a positioning filtering process, storing the water depth information in a database through a Web page of a Web server, and providing a corresponding discharge and the water depth information through the Web page of the Web server, wherein, in the image conversion analyzing operation, in order to perform the homography calculation, average X and Y coordinates of input points are calculated, corresponding coordinates are moved to an origin, a distance between the input points and the average X and Y coordinates is converted, and image data is normalized.

10. The method of claim 9, wherein, in order to calculate a surface flow velocity field to which an optical flow is applied, the operation of calculating the pixel flow velocity includes:

an operation of defining a grid parameter including M points to be analyzed;

an operation of reading a preset grid setting and declaring a number (N) of images photographed by a camera to be analyzed and an array for storing analysis results;

an operation of storing the images photographed by the camera in the array; and an operation of storing the analysis results in the array by repeating analysis between images as many times as a number of grid points.

11. The method of claim 9, wherein, in order to calculate a point flow velocity calculation, the operation of calculating the pixel flow velocity includes:

an operation of declaring image and grid point parameters and extracting an image at a grid point position;

an operation of applying an optical flow pixel flow velocity calculation algorithm, declaring a grid point position parameter, a pixel flow velocity parameter, and a filter coefficient parameter and converting the grid point position and the pixel flow velocity into the actual flow velocity; and an operation of performing filtering when a calculated flow velocity error is greater than a filter coefficient, and otherwise, an operation of outputting a result of a flow velocity calculation.

12. The method of claim 10, wherein, in the operation of calculating the pixel flow velocity, an equation for a pixel flow velocity calculation is defined as $$I(x,y,t)=I(x+\delta x, y+\delta y, t+\delta t)$$

here, I denotes a contrast value of a pixel in the images photographed by the camera, x denotes an X-direction coordinate, y denotes a Y-direction coordinate, t denotes time, δx,y denotes an amount of change in the X-direction coordinate, δy,t denotes an amount of change in the Y-direction coordinate, and δt denotes an amount of time change.

13. The method of claim 9, wherein, in the operation of converting the calculated pixel flow velocity into the actual flow velocity and calculating the discharge using the actual flow velocity, the actual flow velocity is defined as $V_\gamma = V_p \times LPP \times K$ here, $V_\gamma$ denotes the actual flow velocity, $V_p$ denotes the pixel flow velocity, LPP denotes a distance per pixel, and K denotes a scale factor.

14. The method of claim 9, wherein, in the operation of converting the calculated pixel flow velocity into the actual flow velocity and calculating the discharge using the actual flow velocity, the discharge is calculated using a water depth of the analysis point and the actual flow velocity as illustrated in an equation below $$Q = \sum_{i=0}^{N} A_i V_i,$$

here, Q denotes a flow rate, $A_i$ denotes a unit area of the analysis point, and $V_i$ denotes the actual flow velocity of the analysis point.

15. The method of claim 9, wherein the water depth information calculated by a positioning filter process is calculated by including:

transmitting ultrasonic waves to a surface of a measurement target and receiving reflected waves formed by the transmitted ultrasonic waves being reflected from the surface of the measurement target and returned;

estimating a smoothed value at an arbitrary position to filter positioning data received by an ultrasonic sensor, calculating a plurality of smoothed most probable values for an initial fixed bandwidth such that a square of an estimated error is minimum, and calculating a cross-validated residual for each bandwidth;

calculating an optimal bandwidth for each point and selecting a bandwidth close to the optimal bandwidth from among initially input bandwidths;

calculating a final smoothed most probable value by linear interpolation using the smoothed most probable value; and calculating a distance from the surface of the measurement target using the filtered positioning data on a basis of a time difference between an ultrasonic transmission time and a reception time of a reflected wave, an ultrasonic transmission velocity, and a reflection velocity of the reflected wave, and calculating a water depth.

16. The method of claim 15, wherein, in order to estimate a smoothed value at an arbitrary position for filtering the positioning data, $\hat{f}(x_i)$, which is a smoothed value at an arbitrary position $x_i$ in scatterplots, is estimated by local regression using a least-squares method using an equation, $$\hat{E}[Y|x_i] = \hat{\alpha} + \hat{\beta} x_j, x_j \in N_i$$

here, N denotes a local bandwidth around $x_i$ and is optimized for each position, and when a specific bandwidth J is given and a number of parameters in the local bandwidth is N, a local linear regression tracker is obtained using an equation, $$\hat{y}_k = \hat{\alpha} + \hat{\beta} x_k, k = 1, \ldots, N$$

here, $\hat{\alpha}$ and $\hat{\beta}$ are obtained by linear regression of local data which is present in $i_{-J/2}, \ldots i_{+J/2}$, and $\hat{y}_i$ become smoothed most probable values corresponding to position $x_i$.

17. The method of claim 16, wherein, in order to calculate a smoothed most probable value that is linked to a locally adaptive bandwidth, when an observation $y = f(x)$ and a bandwidth $J(x)$ at an x position are given, $J(x)$ and $f(x)$ are calculated such that a square of an estimation error is minimized, using an equation, $$e^2(f, J) = E[Y - f(X|J(X))]^2.$$

18. The method of claim 17, wherein, in order to minimize the square of the estimation error, when a number of pieces of whole data is n, a plurality of smoothed most probable values f(x) are calculated for initial fixed bandwidths J of various sizes between $0 < j < n$, and a cross-validated residual is calculated for each bandwidth J by a cross-validated residual calculating unit using an equation, $$r_{(i)(J)} = [y_i - \hat{f}(x_i | J)] / \left(1 - \frac{1}{J} - \frac{(x_i - x_J)^2}{V_J}\right),$$

wherein, equations, $$V_J = \frac{1}{n} \sum_{j=i-J/2}^{i+J/2} (x_i - x_J)^2, x_J = \frac{1}{J} \sum_{j=i-J/2}^{i+J/2} x_i$$

are satisfied, and wherein the cross-validated residual calculating unit is implemented via at least one processor.

* * * * *